US009374589B2

(12) United States Patent
Ten et al.

(10) Patent No.: US 9,374,589 B2

(45) Date of Patent: Jun. 21, 2016

(54) HDR IMAGES WITH MULTIPLE COLOR GAMUTS

(71) Applicant: DOLBY LABORATORIES LICENSING CORPORATION, San Francisco, CA (US)

(72) Inventors: Arkady Ten, Sunnyvale, CA (US); Ajit Ninan, San Jose, CA (US); Gaven Wang, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/709,978

(22) Filed: May 12, 2015

(65) Prior Publication Data

US 2015/0249832 A1 Sep. 3, 2015

Related U.S. Application Data

(62) Division of application No. 14/239,047, filed as application No. PCT/US2013/053036 on Jul. 31, 2013, now Pat. No. 9,076,224.

(60) Provisional application No. 61/681,061, filed on Aug. 8, 2012.

(51) Int. Cl.

| | |
|---|---|
| ***G06K 9/36*** | (2006.01) |
| ***H04N 19/136*** | (2014.01) |
| ***G06T 5/00*** | (2006.01) |
| ***G06T 5/50*** | (2006.01) |
| ***H04N 19/117*** | (2014.01) |
| ***H04N 19/124*** | (2014.01) |

(Continued)

(52) U.S. Cl.

CPC ............ *H04N 19/136* (2014.11); *G06K 9/4652* (2013.01); *G06T 5/009* (2013.01); *G06T 5/50* (2013.01); *G06T 7/408* (2013.01); *H04N 19/117* (2014.11); *H04N 19/124* (2014.11); *H04N 19/182* (2014.11); *H04N 19/186* (2014.11); *H04N 19/44* (2014.11); *H04N 19/46* (2014.11); *G06T 2207/20008* (2013.01); *G06T 2207/20024* (2013.01); *G06T 2207/20208* (2013.01)

(58) Field of Classification Search

None

See application file for complete search history.

(56) References Cited

U.S. PATENT DOCUMENTS

| | | | |
|---|---|---|---|
| 5,347,374 | A | 9/1994 | Fuss |
| 6,108,047 | A | 8/2000 | Chen |

(Continued)

FOREIGN PATENT DOCUMENTS

| | | |
|---|---|---|
| CN | 101951510 | 1/2011 |
| EP | 1183408 | 3/2009 |

(Continued)

OTHER PUBLICATIONS

Khan, Ishtiaq Rasool, and Masahiro Okuda. "A new encoding scheme for HDR images." Signal Processing and Communications, 2007. ICSPC 2007. IEEE International Conference on. IEEE, 2007.*

(Continued)

*Primary Examiner* — Li Liu

(57) ABSTRACT

Image encoding and decoding are described. An input HDR image that includes a base image and a ratio image may be stored using two or more color description profiles. One profile defines the encoding color space of the base image and the second profile defines the encoding color space of the HDR metadata which may be different than the color space of the base image.

14 Claims, 13 Drawing Sheets

(51) Int. Cl.

| | |
|---|---|
| ***H04N 19/182*** | (2014.01) |
| ***H04N 19/186*** | (2014.01) |
| ***H04N 19/44*** | (2014.01) |
| ***H04N 19/46*** | (2014.01) |
| ***G06K 9/46*** | (2006.01) |
| ***G06T 7/40*** | (2006.01) |

(56) References Cited

U.S. PATENT DOCUMENTS

| | | | | |
|---|---|---|---|---|
| 6,348,929 | B1 | 2/2002 | Acharya | |
| 6,735,330 | B1 | 5/2004 | Van Metter | |
| 6,778,691 | B1 | 8/2004 | Barski | |
| 6,829,301 | B1 | 12/2004 | Tinker | |
| 7,433,514 | B2 | 10/2008 | Sloan | |
| 7,639,893 | B2 | 12/2009 | Duan | |
| 7,643,035 | B2 | 1/2010 | Toyama | |
| 7,747,098 | B2 | 6/2010 | Ward | |
| 7,760,949 | B2 | 7/2010 | Segall | |
| 7,844,174 | B2 | 11/2010 | Pickens | |
| 7,899,267 | B2 | 3/2011 | Dvir | |
| 7,933,462 | B2 | 4/2011 | Ward | |
| 8,014,027 | B1 * | 9/2011 | Kulkarni | H04N 1/6058 358/1.9 |
| 8,081,845 | B2 | 12/2011 | Chen | |
| 8,131,051 | B2 | 3/2012 | Heath | |
| 8,150,199 | B2 | 4/2012 | Zhou | |
| 8,218,625 | B2 | 7/2012 | Ward | |
| 8,248,486 | B1 | 8/2012 | Ward | |
| 8,514,934 | B2 | 8/2013 | Ward | |
| 8,537,893 | B2 | 9/2013 | Efremov | |
| 8,743,291 | B2 * | 6/2014 | Li | G06T 5/009 345/603 |
| 2008/0055426 | A1 | 3/2008 | Pertsel | |
| 2008/0069239 | A1 | 3/2008 | Yan | |
| 2009/0102945 | A1 | 4/2009 | Chen | |
| 2010/0020221 | A1 | 1/2010 | Tupman | |
| 2010/0150473 | A1 | 6/2010 | Kwon | |
| 2010/0164976 | A1 | 7/2010 | Choe | |
| 2010/0177203 | A1 | 7/2010 | Lin | |
| 2010/0329548 | A1 | 12/2010 | Yoshimura | |
| 2010/0329557 | A1 | 12/2010 | Wang | |
| 2011/0019058 | A1 | 1/2011 | Sakai | |
| 2011/0141128 | A1 | 6/2011 | Choi | |
| 2011/0157089 | A1 | 6/2011 | Rainisto | |
| 2011/0211732 | A1 | 9/2011 | Rapaport | |
| 2012/0002898 | A1 | 1/2012 | Cote | |
| 2012/0120277 | A1 | 5/2012 | Tsai | |

FOREIGN PATENT DOCUMENTS

| | | |
|---|---|---|
| JP | 2009-200743 | 9/2009 |
| JP | 2011-010108 | 1/2011 |
| JP | 2012-029029 | 2/2012 |
| KR | 2005-0068327 | 7/2005 |
| KR | 10-1356548 | 12/2008 |
| KR | 10-1225574 | 1/2013 |
| WO | 2012/118961 | 9/2012 |

OTHER PUBLICATIONS

Spaulding, Kevin E., Geoffrey J. Woolfe, and Rajan L. Joshi. "Extending the color gamut and dynamic range of an sRGB image using a residual image." Color Research & Application 28.4 (2003): 251-266.*

Guarnieri, Gabriele, et al. "Nonlinear mapping of the luminance in dual-layer high dynamic range displays." IS&T/SPIE Electronic Imaging. International Society for Optics and Photonics, 2009.*

Ward, G. et al "JPEG-HDR: A Backwards-Compatible, High Dynamic Range Extension to JPEG" In proceedings of the Thirteenth Color Imaging Conference, pp. 283-290, Jan. 1, 2005.

Lee, J. et al "Chromatic Adaptation-Based Tone Reproduction for High-Dynamic-Range Imaging" Optical Engineering, vol. 48, No. 10, pp. 107002, publisher: SPIE—The International Society for Optical Engineering, Published on Oct. 2009.

Banterle, F. et al "High Dynamic Range Imaging and Low Dynamic Range Expansion for Generating HDR Content" Computer Graphics Forum, vol. 28, No. 8, Dec. 1, 2009, pp. 2343-2367.

Li, Yu et al. "Compressing and Companding High Dynamic Range Images with Subband Architectures" ACM Transactions on Graphics Jul. 1, 2005, pp. 836-844.

Rempel, A. G. et al. "Ldr2Hdr: On-the-fly Reverse Tone Mapping of Legacy Video and Photographs" ACM Transactions on Graphics, vol. 26, No. 3, Jul. 29, 2007, p. 39.

Boschetti, A. et al "High Dynamic Range Images Coding: Embedded and Multiple Description" Jan. 1, 2011, APSIPA ASC 2011.

Ward, G. et al "Subband Encoding of High Dynamic Range Imagery" in First ACM Symposium on Applied Perception in Graphics and Visualization, pp. 83-90, 2004.

Reinhard, E. et al "High Dynamic Range Imaging—Acquisition, Display and Image-Based Lighting", pp. 108-108, Elsevier, MA 2010.

Bharanitharan, K. et al "Super Resolution Video by Using Classified Multi-Filter Up-Sampling Algorithm" Published in 2011, IEEE International Symposium on Broadband Multimedia Systems and Broadcasting.

Wang, J. et al. "A New MSBF-Based HDR Image Processing Algorithm" IEEE International Conference on Cybernetics and Intelligent Systems, Conference in Chengdu, China on Sep. 2008. Publication date: Dec. 23, 2008, pp. 1232-1237.

Ramachandran, S. et al "Design and FPGA Implementatiion of a Video Scalar with on-chip Reduced Memory Utilization" Proc. Euromicro Symposium on Digital System Design, Sep. 1-6, 2003, pp. 206-213.

Linan, G et al. "Experimental Demonstration of Real-Time Image Processing Using a VLSI Analog Programmable Array Processor" Proc. SPIE, 3962, Applications of Artificial Neural Networks in Image Processing, Apr. 14, 2000.

Tsai, An-Chao et al. "Classified Multifilter Up-Sampling Algorithm in Spatial Scalability for H.264/SVC Encoder" Institute of Electrical and Electronics Engineers, Inc., published on Jun. 1, 2010, pp. 861-869, vol. 20, Issue 6.

ITU JPEG Standard of the Joint Photographic Experts Group of the International Telecommunication Union and the International Electrotechnical Commission, JPEG ISO/IEC 10918-1 ITU-T Rec. T 81.

Mertens, T. et al "Exposure Fusion" 15th Pacific Conference on Computer Graphics and Applications pp. 382-390, Pacific Graphics 2007.

J.A. Nelder, J. et al. "A Simplex Method for Function Minimization" Computer Journal, No. 7, pp. 308-313, 1965.

* cited by examiner

HDR IMAGES WITH MULTIPLE COLOR GAMUTS

CROSS-REFERENCE TO RELATED APPLICATIONS

This application is a divisional of U.S. patent application Ser. No. 14/239,047, filed on Feb. 14, 2014, which is the National Stage Entry of PCT Application PCT/US2013/053036, filed on Jul. 31, 2013, which claims priority to U.S. Provisional Patent Application No. 61/681,061, filed on Aug. 8, 2012, all of which are hereby incorporated herein by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNOLOGY

The present invention relates generally to imaging processing. More particularly, an embodiment of the present invention relates to image processing for images with high dynamic range (HDR).

BACKGROUND

Some contemporary or legacy digital images conform to 24-bit formats. These images comprise as much as 24 bits to store both color and brightness information, such as luminance and chrominance data, for each pixel in an image. Such formats preserve enough image information to allow the image to be rendered or reproduced by legacy electronic displays and are thus considered to be output referred standards. Legacy displays typically have a dynamic range (DR) of three orders of magnitude. As normal human vision can discriminate contrast ratios of up to 1:10,000 or more however, images with significantly higher dynamic ranges may be perceived.

Developments in modern electronic display technology allow image rendering and reproduction at a higher dynamic range, which significantly exceeds the DR of legacy displays. High dynamic range (HDR) images more faithfully represent real-world scenes than image formats that conform to output referred standards. Thus, HDR images may be considered as scene referred. In the context of HDR images and displays that are capable of rendering them, legacy or other images and displays of more limited DR may be referred to herein as low dynamic range (LDR) images/displays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
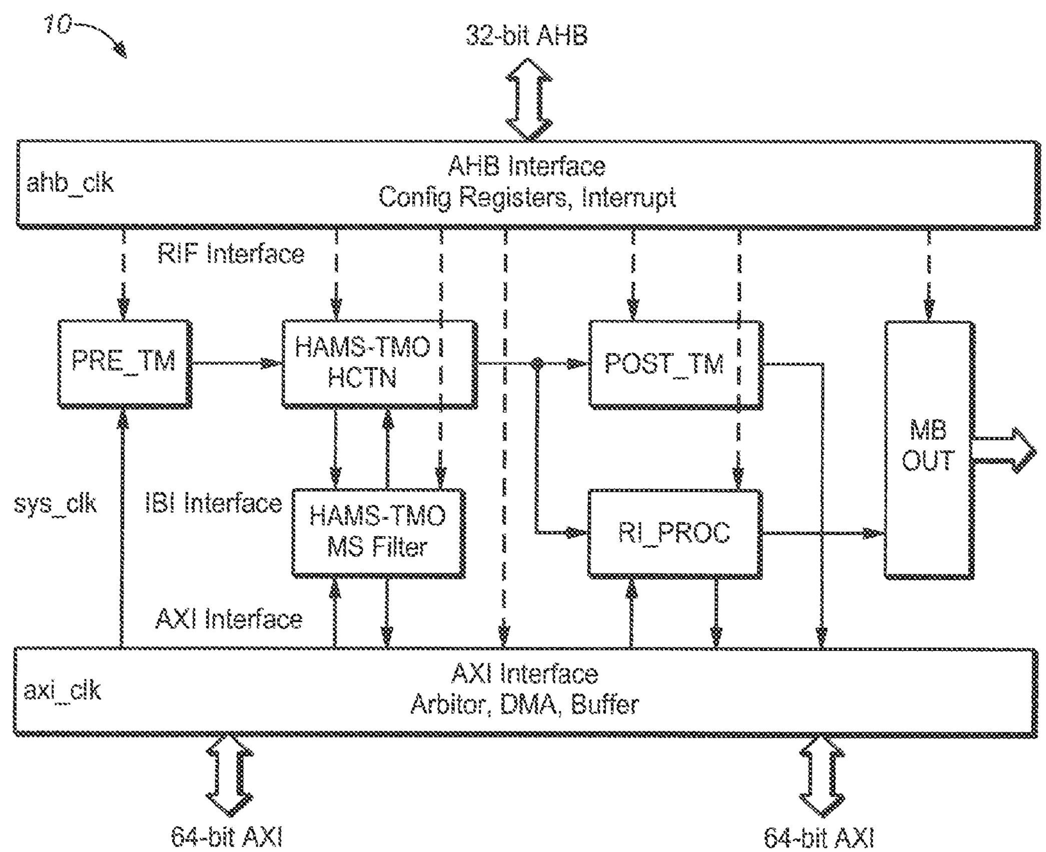
FIG. 1A depicts an example local multiscale tone mapping system, according to an embodiment of the present invention.

Example embodiments, which relate to image processing of HDR images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating an aspect of the present invention.

Overview—HDR Images

This overview presents a basic description of some aspects of example embodiments of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example an embodiment that follows below.

An example embodiment of the present invention relates to encoding HDR images. Log-luminances in an HDR input image are histogrammed to generate a tone-map, along with which a log global tone-mapped luminance image is computed. The log global tone-mapped luminance image is downscaled. The log-luminances and the log global tone-mapped luminance image generate a log ratio image. Multi-scale resolution filtering the log ratio image generates a log multi-scale ratio image. The log multi-scale ratio image and the log luminances generate a second log tone-mapped image, which is normalized to output a tone-mapped image based on the downscaled log global tone-mapped luminance image and the normalized image. The HDR input image and the output tone-mapped image generate a second ratio image, which is quantized.

An array of active devices (e.g., transistors) are disposed in a semiconductor die. The active devices are configured or operably interconnected to function as an image encoder. The encoder has a first tone mapper for histogramming multiple logarithmic luminance values, which are derived from each pixel of a high dynamic range (HDR) input image. The first tone mapper renders a first ratio image with the histogrammed values. A multiple-scale filter-decimator downscales the first ratio image and low-passing each pixel thereof in a horizontal direction and a vertical direction recursively. Dependent on a size of the first ratio image, the first ratio image is decimated and filtered over, one, two or three levels. A corresponding ratio image is thus rendered at each of the levels. Each of the corresponding ratio images are written to storage (e.g., memory) that is independent of (e.g., external to) the IC device. An amplifier at each of the levels weights each of the filtered pixels of each of the corresponding ratio images with a scaling factor that corresponds to each level over which the decimator functions. A bilinear interpolator upscales each of the weighted ratio images to the level that is next subsequent to each of the previous levels. An adder at each of the levels sums each of the weighted ratio images with the weighted ratio image from the next previous level. A second tone mapper tone maps a base image and a tone-mapped ratio image thereof, each of which corresponds to the input HDR image but with a lower dynamic range. The base image and the base ratio image thereof are quantized. The quantized base image and base ratio image may be output, e.g., to a JPEG encoder for compression in the JPEG format.

Some modern electronic displays render essentially scene referred HDR images, which exceed the DR capability of legacy displays. In the context of display DR capability, the terms "render," "reproduce," "recover," "present," "produce," "restore" and "generate" may be used synonymously and/or interchangeably herein). An embodiment of the present invention functions effectively with both modern displays, as well as legacy displays. An embodiment allows capable modern displays to render HDR images at substantially their full contrast ratio and, backwards compatibly, allows legacy and LDR display devices to render the image within their own, somewhat more limited DR reproduction capabilities. An embodiment supports such backwards compatibility to LDR displays as well as new HDR display technologies.

An embodiment represents an HDR image essentially with a tone-mapped base image (such as an instance of an image that has a lower DR than a corresponding HDR instance of the image) along with encoded metadata, which provides additional information about the image. The additional information comprises image intensity related (e.g., luminance, luma) data and/or color related (e.g., chrominance, chroma) data. The additional data is related to the difference in DR between an HDR image instance and the corresponding base image instance. Thus, a first (e.g., legacy) display that has relatively limited DR reproduction capability may use the tone-mapped image to present a normal DR image, e.g., according to an existing, established or popular image compression/decompression (codec) standards.

An example embodiment allows the normal DR images to be processed according to the JPEG Standard of the Joint Photographic Experts Group of the International Telecommunication Union and the International Electrotechnical Commission, JPEG ISO/IEC 10918-1 ITU-T Rec. T.81, which is incorporated by reference, for all purposes, in its entirety as if fully set forth herein. Moreover, a second (e.g., modern) HDR-capable display may process the tone-mapped image along with the image metadata to present the HDR image effectively. On one hand, the tone-mapped image is used to present a normal dynamic range image on a legacy display. On the other hand, the additional metadata may be used with the tone-mapped image to generate, recover, or present a HDR image (e.g., by a HDR display). An embodiment uses a tone mapping operator (TMO) to create tone-mapped image instances based on HDR images.

Various TMOs, such as the Reinhard global photographic operator, may be used to produce tone-mapped images relatively efficiently. Where computational cost is irrelevant, available or otherwise ignorable, a bilateral filter may be used to produce relatively high quality tone-mapped images. Bilateral filtering helps preserve image details, such as in bright areas thereof, which the typically more computationally economical Reinhardt operator may lose. Additionally or alternatively, histogram adjustment operator TMOs and/or gradient domain operator TMOs may be used.

In an embodiment, an image format renders HDR images capably and efficiently as well as non-HDR images. Embodiments may function with the JPEG format and/or with various other image formats. For example, embodiments may function with one or more of the MPEG, AVI, TIFF, BMP, GIF, or other suitable formats, which are familiar to artisans skilled in fields relating to images. An embodiment functions according to the JPEG-HDR image format, which is described in Ward, Greg and Simmons, Maryanne, "Subband Encoding of High Dynamic Range Imagery," in *First ACM Symposium on Applied Perception in Graphics and Visualization* (*APGV*), pp. 83-90 (2004); Ward, Greg and Simmons, Maryanne, "JPEG-HDR: Backwards-Compatible, High Dynamic Range Extension to JPEG," in *Proceedings of the Thirteenth Color Imaging Conference*, pp. 283-290 (2005); and E. Reinhard, G. Ward, et al. *High Dynamic Range Imaging-Acquisition, Display and Image-Based Lighting*, pp. 105-108, Elsevier, Mass. (2010), which are incorporated by reference in their entirety for all purposes as if fully set forth herein.

To display images on a wide variety of image rendering devices, tone mapping operators (TMOs) process input HDR images into tone mapped (TM) base images. The TM base images may comprise color alterations (e.g., hue changes, color clippings, artistic looks, etc.) relative to the input image. Under some techniques, TM base images are provided to downstream image decoders along with luminance ratios to reconstruct HDR images equivalent to the input HDR images. However, a downstream image decoder would not be able to remove color alterations in a reconstructed HDR image, relying on a TM base image and gray scale luminance ratios. As a result, the color alterations would remain noticeable in the reconstructed HDR image.

HDR image encoders of an embodiment described herein create not only luminance ratios but also color residual values based on an input HDR image and a TM base image. The luminance ratios and color residual values may be collectively denoted as HDR reconstruction data. Optionally and/or additionally, the luminance ratios are transformed into a logarithmic domain to support a relatively wide range of luminance values. Optionally and/or additionally, the resultant logarithmic luminance ratios and the color residual values are quantized. Optionally and/or additionally, the quantized logarithmic ratios and color residual values are stored in a residual image. The quantized logarithmic ratios and color residual values, or the residual image in some embodiments, are provided with the TM base image to a downstream image decoder. Optionally and/or additionally, parameters related to the quantized logarithmic ratios and color residual values (e.g., range limits, etc.) are also provided with the TM base image.

A TMO of an embodiment described herein may freely perform color clippings in color channels for individual pixels with low (black) or high (white) luminance levels. Also, a TMO as described herein is not required to maintain hue at each pixel. Under techniques described herein, a user is free to select a TMO based on image content (e.g., human figures, an indoor image, an outdoor scene, a night view, a sunset, etc.) or applications (e.g., used in a movie, a poster, a wedding photo, a magazine, etc.). Color clippings or modifications may be deliberately and freely used to create artistic looks of images. HDR image encoders and decoders herein support TMOs implemented by different types of editing software and camera makers that may introduce a wide range of possible color alterations. Under techniques described herein, the HDR encoders provide color residual values to the HDR decoders. The HDR decoders in turn make use of the color residual values to prevent (or minimize) the color alterations from being present in reconstructed HDR images.

An embodiment may use bit streams and/or image files to store and provide TM base images and their respective, corresponding HDR reconstruction data to downstream image viewers or decoders for decoding and/or rendering. In an example embodiment, an image format supports TMOs, which may be implemented with various editing software applications and/or camera makers. Example embodiments may function with various image formats including for example standard JPEG image formats and extended, enhanced, augmented or improved JPEG related formats such as JPEG-HDR. Additionally, alternatively or optionally, an example embodiment may use an image format that is based on or used with a codec/standard that varies in one or more substantial aspects, attributes, objects, coding specifications or performance parameters in relation to those that may be used with a JPEG related image format. An example embodiment uses a JPEG-HDR image format to support storing a TM base image with luminance ratios and color residual values. Additionally, optionally or alternatively, one or both of the TM base image and the residual image stored in an image file may be compressed. In an example embodiment, image data compression is performed according to the JPEG standard. Additionally, alternatively or optionally, an example embodiment may perform compression according to a standard that varies in one or more substantial aspects, attributes, objects, coding specifications or performance parameters in relation to those that may be used with a JPEG related image format.

As the JPEG format is limited to LDR images, the JPEG-HDR comprises essentially a backwards-compatible HDR extension to the JPEG format. JPEG-HDR simultaneously supports HDR image rendering on new HDR display devices and non-HDR (e.g., LDR) image rendering on HDR or non-HDR display devices. JPEG-HDR stores a tone-mapped image in standard locations (e.g., in a bitstream, in a disc format, etc.) as defined in JPEG and store additional metadata in new locations that may be ignored by non-HDR display devices. The additional metadata may be used together with the tone-mapped image to generate/restore an HDR version of an original HDR image.

In an embodiment, a JPEG HDR encoder is implemented with or disposed within an Integrated Circuit (IC) device. In an embodiment, devices, circuits and/or mechanisms as described herein comprise a component in a camera or another image recording and rendering or display system, a cellular radiotelephone, a personal digital assistant (PDA), or a personal, portable or consumer electronic device (e.g., for pictures, computing, movies, music, information, entertainment, calculating, voice).

An embodiment may perform one or more functions as described in Patent Application Number PCT/US2012/033795, filed on Apr. 16, 2012, by Wenhui Jia, et al. entitled ENCODING, DECODING, AND REPRESENTING HIGH DYNAMIC RANGE IMAGES, (now U.S. Pat. No. 8,248,486), which is incorporated herein by reference in its entirety.

An embodiment may perform one or more functions as described in Patent Application Number PCT/US2012/027267, filed 1 Mar. 2012, pursuant to the PCT by Gregory John Ward entitled LOCAL MULTI-SCALE TONE MAPPING OPERATOR, which is incorporated herein for all purposes by reference in its entirety.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

Example JPEG HDR Encoder

In an embodiment, a JPEG HDR encoder is implemented with an Integrated Circuit (IC) device, which is commonly referred to as chip. For example, the encoder may be disposed within the IC device. The IC device may be implemented as an application specific IC (ASIC) device, a digital signal processor (DSP), a field programmable gate array (FPGA), and/or a graphics processor. The IC device may be implemented as a system on a chip (SOC) with an ASIC or with one or more configurable or programmable devices such as a microprocessor, a programmable logic device (PLD), a field programmable gate array (FPGA) or a microcontroller.

The IC device comprises an array of active device components such as transistors, which are disposed within a semiconductor die. The active device components are arrayed, arranged, configured and/or programmed to function as modules, registers, caches, logic gates, logic and computation (e.g., arithmetic/floating-point) units or perform other such operations that may be consistent with JPEG HDR encoding. The active components of the array are interconnected with an at least partially conductive routing fabric, such as a network of traces/vias, a latticework of address/word lines or the like, which are disposed within the die to allow electrical/electronic exchange of signals and data between the active device components and the various functional modules that are formed therewith. The active components are operationally addressable (e.g., through nodes or portions the routing fabric) with an at least partially conductive interface, which allows electrical, electronic and/or communicative coupling with signal, data and power sources that are external to the IC device.

An example JPEG HDR encoder embodiment is described herein as implemented with an ASIC. For clarity, simplicity, brevity and consistency, the example ASIC implementation described herein also represents configurable and programmable IC implementations. FIG. 1A depicts an example JPEG HDR encoder 10, according to an embodiment of the present invention.

Example encoder 10 is implemented with an ASIC. Encoder 10 receives input images through an advanced high performance bus (AHB) interface. Pre tone mapping Pre_TM converts input image data into a format that is useful for tone mapping. PRE_TM performs chroma upsampling, e.g., from a 4:2:2 chroma sampling format to a 4:4:4 format. PRE_TM converts the color space of the image input (e.g., YCbCr) into a tristimulus color space, such as RGB. Pre_TM performs a reverse (inverse) gamma (γ) correction over the RGB converted image.

Encoder 10 performs a tone mapping function, which generates a tone mapped base image from an input HDR image. Encoder 10 may be implemented to handle HDR images that are input in a variety of formats, such as the example input formats shown in Table 1, below.

TABLE 1

| FORMAT | BIT DEPTHS |
|---|---|
| RGB linear | 16, 14, 12 |
| YCbCr 4:2:2 linear | 16, 14, 12 |
| YCbCr 4:4:4 linear | 16, 14, 12 |
| RGB gamma | 14, 12, 10 |
| YCbCr 4:2:2 gamma | 14, 12, 10 |
| YCbCr 4:4:4 gamma | 14, 12, 10 |

Figure 2:
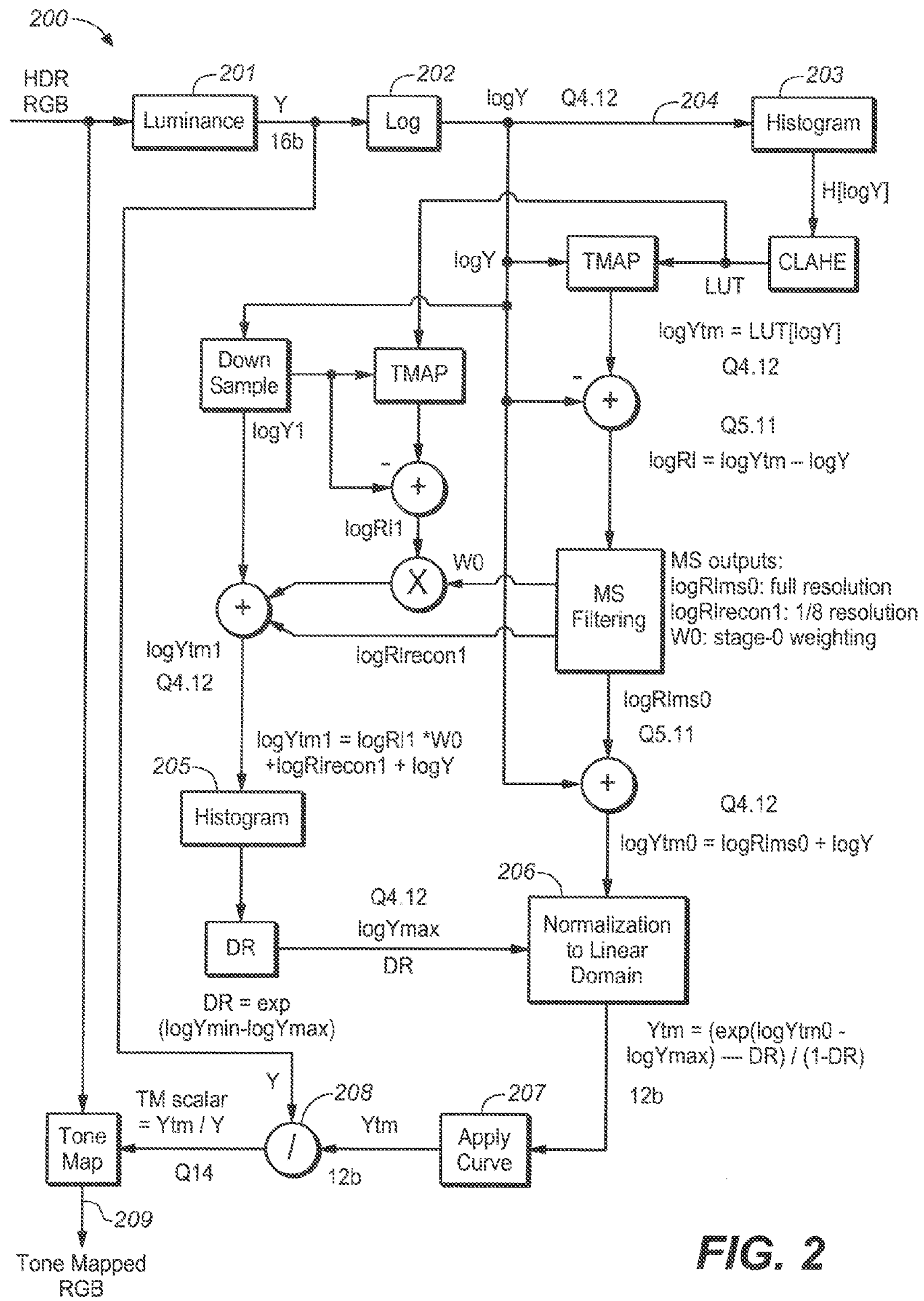
FIG. 2 depicts an example local multiscale image processing method, according to an embodiment of the present invention.

The tone mapping function comprises a histogram adjusted multi-scale tone mapping operator (HAMS-TMO), which uses contrast-limited adaptive histogram equalization (CLAHE) to perform a tone map normalizing function over the input HDR images. The normalizing function may be implemented with histogram CLAHE tone map normalization (HCTN) over input images. HAMS-TMO HCTN outputs a normalized tone mapped base image in a 12 bit linear RGB format. Example HAMS-TMO HCTN embodiments are described below (FIG. 2 and FIG. 3). A ratio image processor RI_Proc may compute and process one or more ratio images from the normalized tone mapped base image.

Upon HAMS-TMO HCTN processing, post tone mapping Post_TM restores the gamma correction over the normalized 12 bit RGB image and generates an 8 bit RGB image therewith. Post_TM is responsible for sending the tone-mapped base image to the JPEG encoder for compression. Post_TM converts the RGB color space of the gamma-re-corrected 8 bit image into an YCbCr image with a JPEG-compatible color format (e.g., 4:2:2 or 4:2:0). For example, the Post-TMO may comprise the following operations: Gamma encoding (where a 12-bit RGB input is translated to an 8-bit input, typically through a user-defined look-up table), RGB to YCbCr color transformation (e.g., via 3×3 color matrix transform), and 4:4:4 to 4:2:2 or 4:2:0 transformation via appropriate sub-sampling of the chroma color planes. The encoder 10 may comprise more than one post tone mapping module Post_TM sub-block. For example, encoder 10 may be implemented with three (3) Post_TM sub-blocks.

Figure 1B:
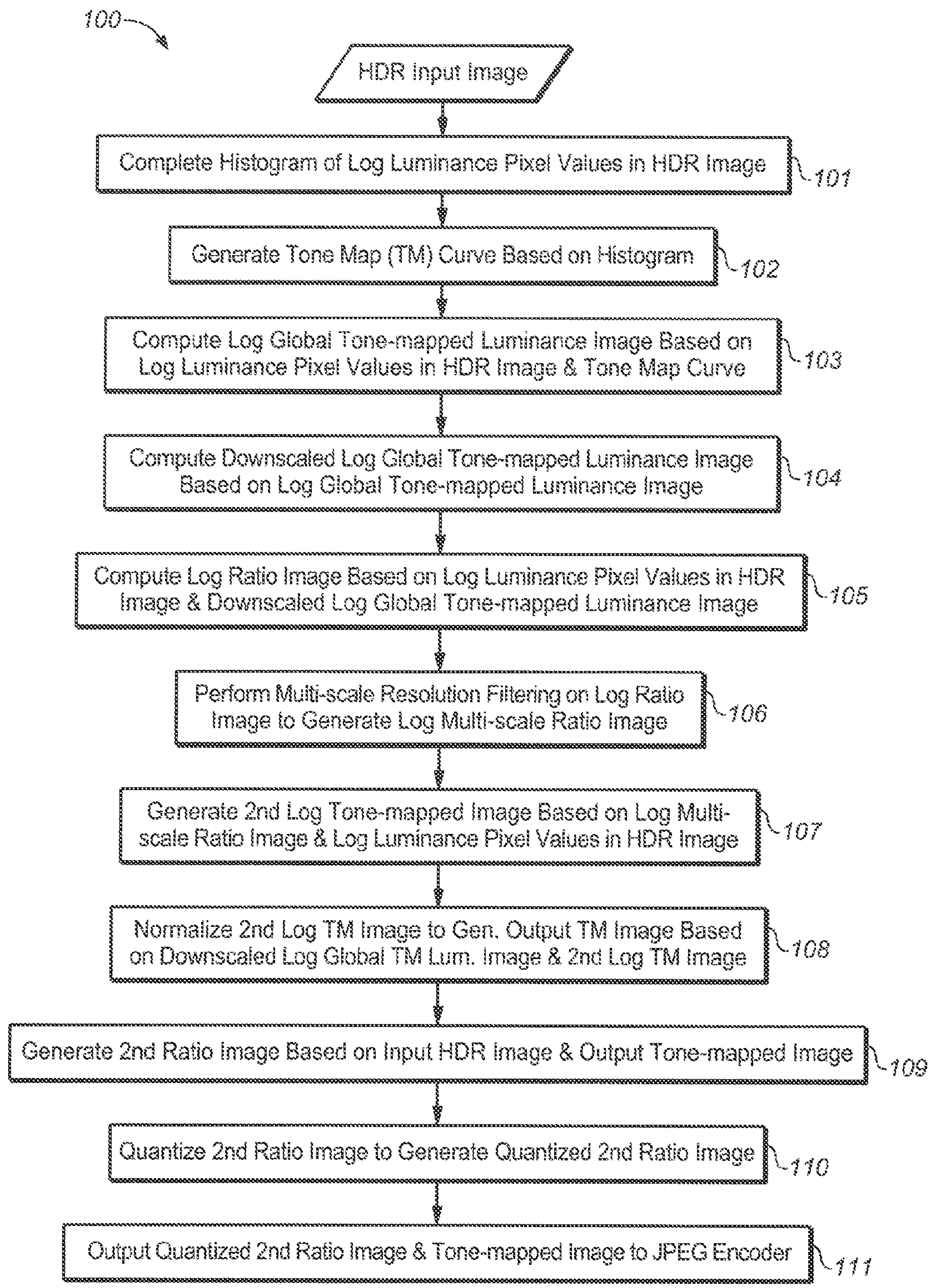
FIG. 1B depicts an example image encoding process, according to an embodiment of the present invention.

FIG. 1B depicts an example image encoding process 100, according to an embodiment of the present invention. In an embodiment, encoder 10 functions as described in relation to process 100 upon receiving or accessing an input HDR image. In step 101, a histogram is computed based on logarithmic (log) luminance values of the pixels in the HDR input image. A tone map curve is generated in step 102, based on the computed histogram. In step 103, a logarithmic global tone-mapped luminance image is computed based on the logarithmic luminance pixel values of the input HDR image and the tone map curve.

In step 104, the log global tone-mapped luminance image is downsampled (e.g., decimated vertically and horizontally) to compute a downscaled log global tone-mapped luminance image. A log ratio image is computed in step 105 based on the downscaled log global tone-mapped luminance image and the log luminance pixel values of the HDR input image. In step 106, multiscale filtering is performed on the log ratio image to generate a log multiscale ratio image. A second log tone-mapped image is generated in step 107, based on the log multiscale ratio image and the log luminance pixel values of the HDR input image.

In step 108, the second log tone-mapped image is normalized to change the range of pixel intensity values and achieve contrast stretching. and an output tone-mapped image is generated based thereon and on the downscaled log global tone-mapped luminance image. A second ratio image is generated in step 109 based on the output tone-mapped image and the input HDR image. In step 110, the second ratio image is quantized. In step 111, the output tone-mapped image and the quantized second ratio are output to a JPEG encoder. At each step of example process 100, the generated global tone-mapped images and ratio imaged may be written to and/or read from an external memory, e.g., via the interfaces of example encoder 10.

FIG. 2 depicts an example histogram adjusted multi-scale tone mapper 200, according to an embodiment of the present invention. In an embodiment, histogram adjusted multi-scale tone mapper 200 implements the HAMS-TMO HCTN function, described above (FIG. 1). HAMS-TMO 200 receives an HDR image in a tristimulus (e.g. RGB) or other (e.g., YCbCr) color space. A luminance module (201) computes 16 bit luminance values Y over the input HDR RGB image. A logarithmic luminance module LOG (202) transforms the luminance value Y from a linear domain to a logarithmic domain. The LOG 202 module implements the transformation into base-2 logarithms of the luminance values Y, 'log Y'.

Upon transforming 16 bit linear luminance values, the LOG module saves the resulting base-2 logarithm ($\log_2$) values log Y as Q4.12 data (e.g., 4 bits before the notional binary point and 12 bits thereafter). For example, logarithms comprise integer and fractional components. Thus, an embodiment separates the integer log Y component and the fractional log Y component to implement the base-2 logarithm $\log_2 Y$. The integer portion is computed according to the number of left shifts in normalization and the fractional 8 bits are indexed to a lookup table LUT, e.g., as shown in the example pseudo-code of Table 2, below.

TABLE 2

```
/* TMO base-2 log LUT */
  for (i=0;i<256;i++) {
    if (i==0) {
      F_12g8b[i] = 0;
    } else {
      /* LUT[i] = log_2 (256+i)/256 */
      double val = log((double)(256+i))/log(2.0) - 8.0;
      val = val * (1<<12);
      F_12g8b[i] = (short)val;
    }
  }
  /* integer part of log_2(x) */
  count = 0;
  while ((x&0x8000)==0) {
    x <<= 1;
    count++;
  }
  acc = 16 - 1 - count;
  acc <<= qout;
  /* fractional bits */
  x <<= 1;   /* remove constant 1 */
  x >>= 8;   /* 8-bit look up */
        acc += F_12g8b[x];
```

A histogram HIST (203) that comprises 512 bins is built from the fractional log Y component. The fractional log luminance values are treated as 16-bit integer values. Thus, the interval between bins comprises 65536/512=128. HAMS-TMO 200 then performs CLAHE adjustments over the histogram. The dynamic range is computed from the histogram, e.g., according to the example pseudo-code shown in Table 3A, below.

TABLE 3A

```
/* find max and min of input */
   for (i=0;i<nbins;i++) {
      if (hist[i]>0) break;
   }
   bmin = i;
   ymin = i * 128;
   for (i=nbins-1;i>=0;i--) {
      if (hist[i]>0) break;
   }
   bmax = i;
   ymax = i * 128;
   /* input dynamic range */
         drin = ymax - ymin;
```

The output dynamic range (ODR) is configurable with default value 3.5 in the natural (base-e) logarithm domain, which is translated to a base-2 value of five (5). A histogram clipping factor 'cf' is computed, e.g., per:

cf=((odr*(*b*max−*b*min+1))<<12)/(*dr*in);

and the histogram may be adjusted therewith over multiple iterations, e.g., according to the pseudo-code shown in Table 3B, below.

TABLE 3B

```
#define CLAHE_ITERATIONS 10
for (t=0;t<CLAHE_ITERATIONS;t++) {
   trimmed=0;
   hc = npix / cf;
   for (i=0;i<nbins;i++) {
      if (hist[i] > hc) {
         trimmed += hist [i] - hc;
         hist[i] = hc;
      }
   }
   /* re-distribute trimmed pixels */
   trimmed = trimmed / (bmax−bmin+1);
   for (i=bmin;i<=bmax;i++) {
      hist[i] += trimmed;
   }
}
```

A cumulative histogram is computed from the adjusted histogram and mapped to a 12-bit log domain in a Q4.12 data format, e.g., according to the pseudo-code shown in Table 3C, below.

TABLE 3C

```
cum = 0;
   for (i=0;i<nbins;i++) {
      cum += hist[i];
      /* normalization and mapped to 12-bit log-domain in Q4.12 */
   acc = ((cum <<12) / npix − (1<<12)) * odr + (12<<12);
      fmap[i] = (unsigned short)acc;
   }
```

Such CLAHE histogram equalization generates a mapping curve, which is implemented as a global tone mapping operator for the log Y image. As the mapping curve comprises the 512 bins, linear interpolation is computed over the luminance values in each of the 512 bins, e.g., according to the pseudo-code shown in Table 3D, below.

TABLE 3D

```
for (row=0;row<height;row++) {
   for (col=0;col<width;col++) {
      int offset = row * width + col;
      /* which bin it falls into */
      bin = ly[offset] / 128;
      /* end points for interpolation */
      x0 = bin * 128;
      x1 = (bin+1)*128;
      f1 = fmap[bin];
      if (bin==0) {
         f0 = 0;
      } else {
         f0 = fmap[bin−1];
      }
      /* linear interpolation */
      val0 = (ly[offset] − x0) * f1;
      val1 = (x1 − ly[offset]) * f0;
      lytm[offset] = (val0 + val1) >> 7;
   }
         }
```

The CLAHE mapping output comprises a log Y image (204) in Q4.12 format. In an embodiment, HAMS-TMO 200 is implemented with a block that performs a histogram CLAHE (contrast-limited adaptive histogram equalization) tone map normalization function.

Figure 3A:
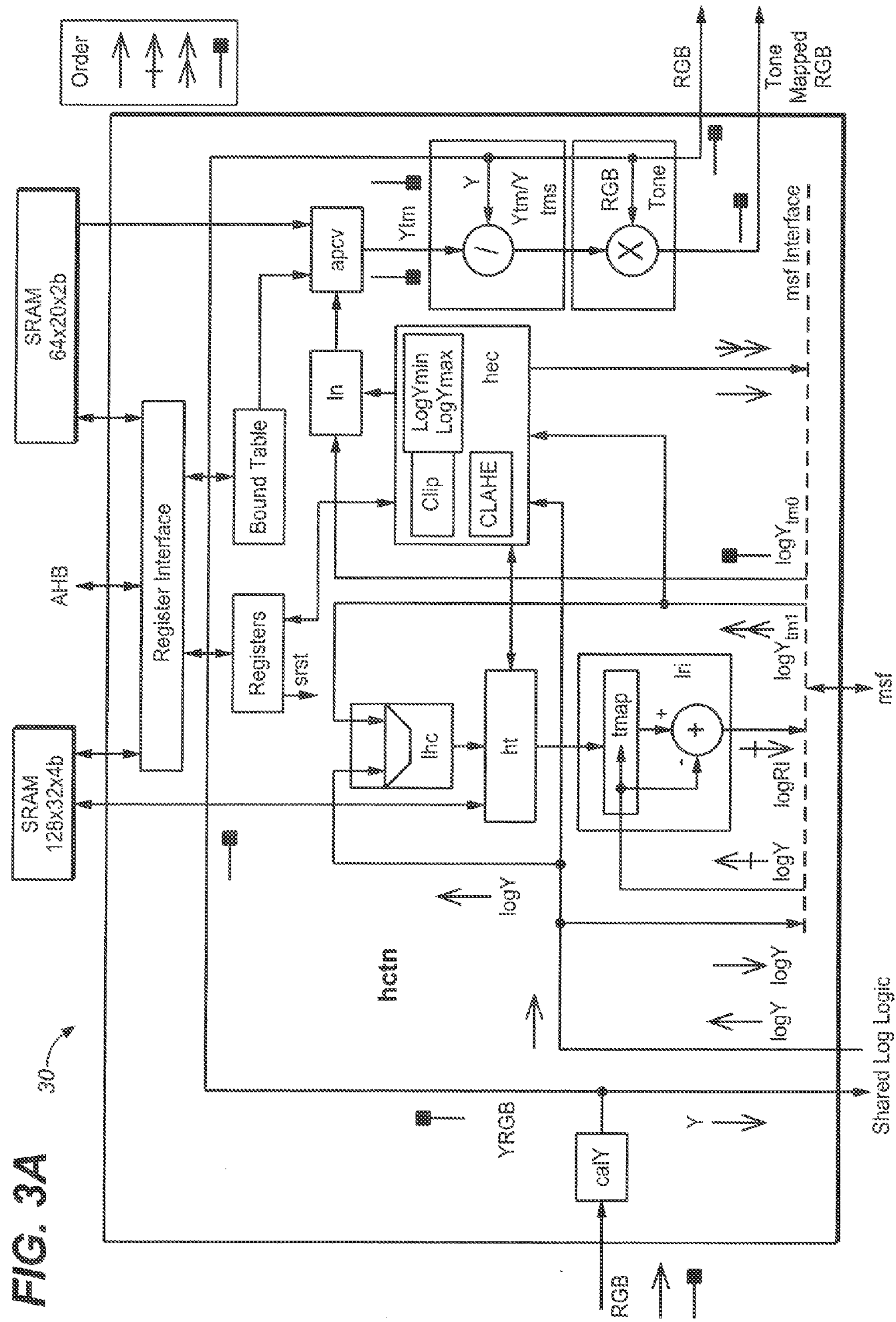
FIG. 3A and FIG. 3B respectively depict an example HCTN block and corresponding multiscale filtering, according to an embodiment of the present invention.
Figure 3B:
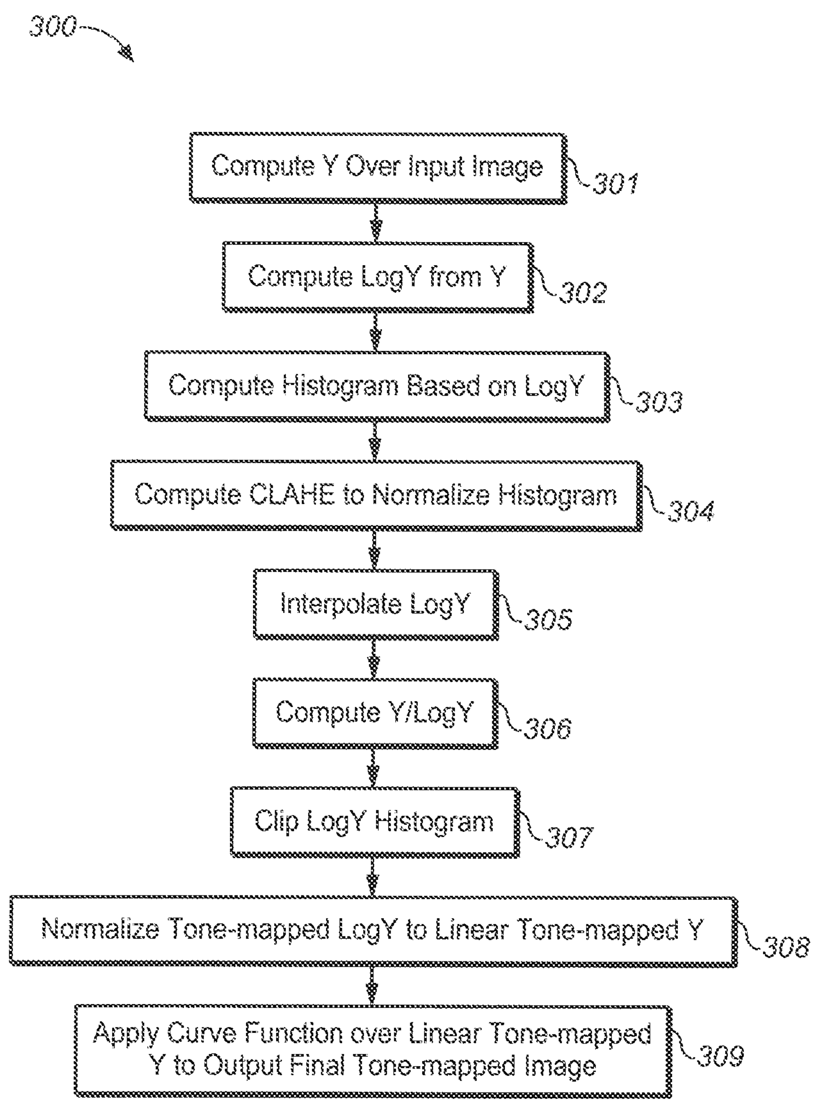

FIG. 3A and FIG. 3B respectively depict an example histogram CLAHE tone map normalization (HCTN) block 30 and a flow of a corresponding example HCTN process 300, according to an embodiment of the present invention. HCTN block 30 may be implemented to support images of 25 million pixels or more. Upon receiving an input image in a tristimulus (e.g., RGB) or other (e.g., YCbCr) color space, HCTN 30 computes a luminance value Y thereof (process step 301). In step 302, the Y values are exported to shared logic for computation of logarithm values 'log Y' corresponding thereto, which are returned to HCTN block 30. In step 303, a histogram is computed based on the log Y values and stored in a table 'ht0'. Upon counting all input image pixels, contrast-limited adaptive histogram equalization (CLAHE) is computed to normalize the ht0 histogram values in step 304.

Upon counting all input image pixels, contrast-limited adaptive histogram equalization (CLAHE) is computed to normalize the ht0 histogram values in step 304. In step 305, the buffered log Y values are interpolated and a logarithmic tone mapped image 'log Ytm' thus generated. For example, the tone mapping curve is implemented over 512 bins of the histogram. Thus, linear interpolation is computed over the luminance values in each of the 512 bins to achieve log Ytm. In step 306, a logarithmic ratio image 'log RI' is computed from the log Y values and the log Ytm image with a subtractive function executing over the logarithmic domain: log RI=log Ytm−log Y. In step 307, the Log Y histogram is then clipped. In step 308, after multi-scale filtering, the tone-mapped log Y values are normalized to linear luminance values Y'. In step 309, an optional curve function may be applied over the linear tone-mapped Y' values to output a final tone-mapped image.

Figure 4A:
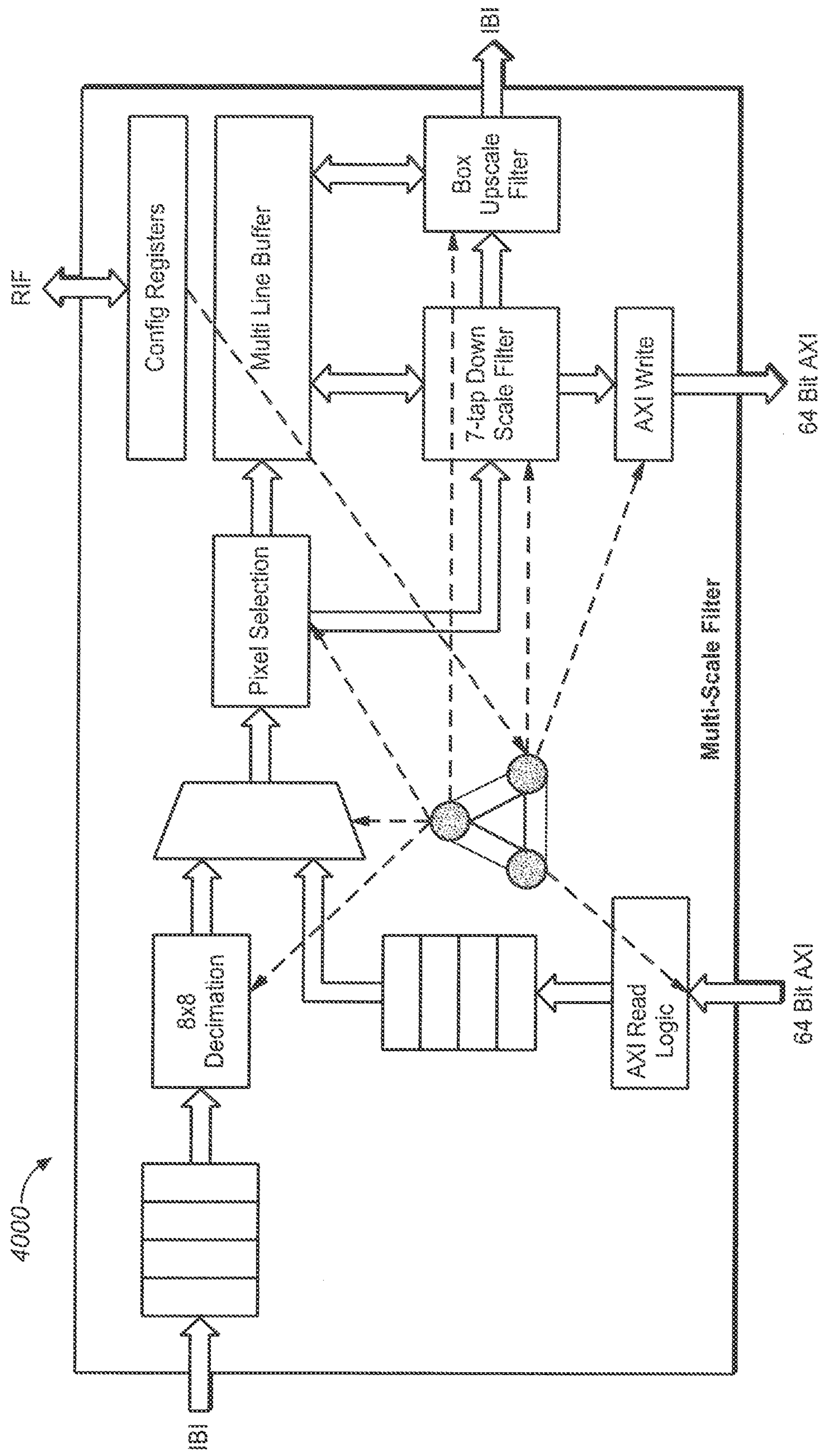
FIG. 4A, FIG. 4B, and FIG. 4C respectively depict an example multiscale filter block and corresponding an example multiscale filtering implementation and example process, according to an embodiment of the present invention.
Figure 4B:
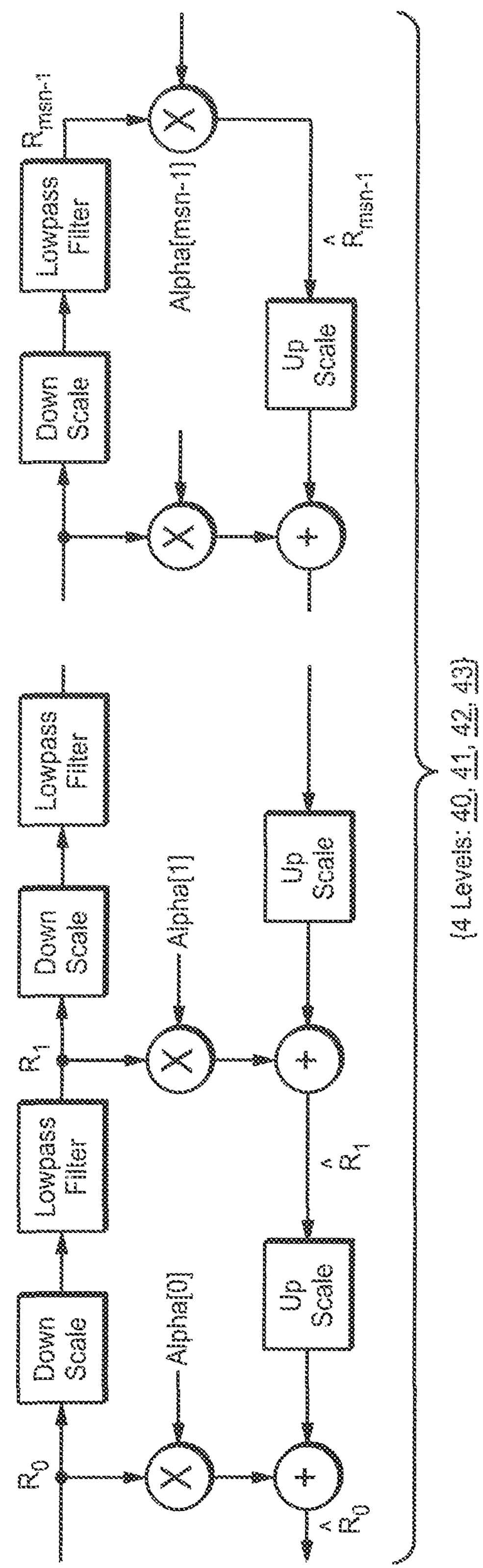
Figure 4C:
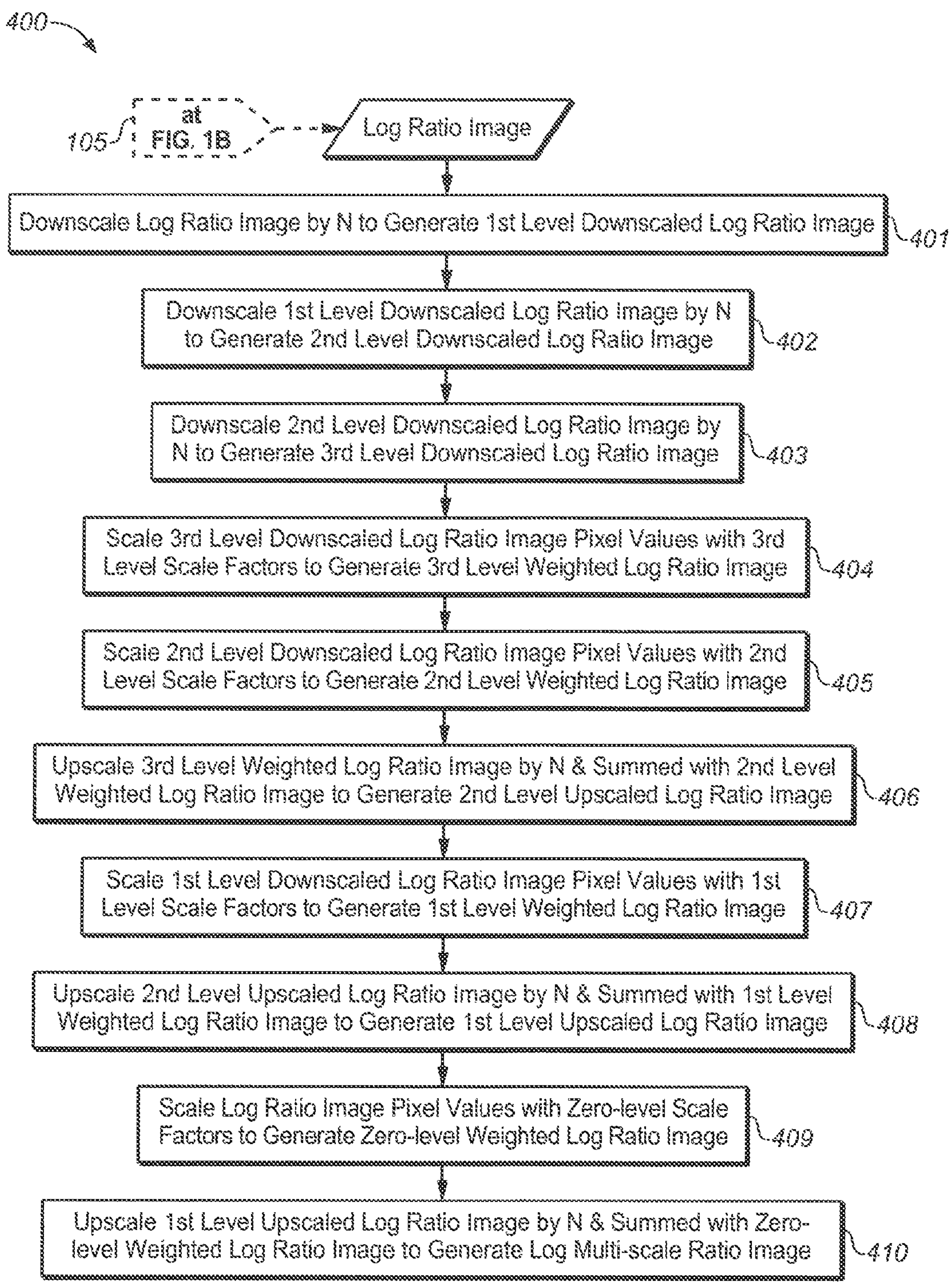

FIG. 4A, FIG. 4B and FIG. 4C respectively depict an example multiscale filter (MSF) block 4000, and corresponding example multiscale filtering implementation and example process 400, according to an embodiment of the present invention. Like HCTN block 30 (FIG. 3A), MSF 4000 may be implemented to support images of 25 million pixels or more. MSF 4000 decimates an input log ratio image IBI by a pre-computed factor (e.g., 8) over its horizontal dimension and over its vertical dimension. MSF 4000 low-pass filters each pixel that comprises the decimated image over multiple, e.g.

seven (7), taps. The low-passed downscaled image may be subsequently upscaled, e.g., by the same pre-computed factor with which it had been downscaled previously.

MSF 4000 pre-computes a number 'msn' of stages over which the input image is scaled based on its original size at input, e.g., according to example implementing equation: msn=floor($\log_8$ min(width, height))+1=floor($\log_2$ min(width, height)/3)+1. MSF 4000 may be implemented to decimate an input log ratio image IBI by a factor of up to eight (8) over its horizontal dimension and over its vertical dimension over each of four (4) stages for a total of 64 in each dimension.

Thus in an embodiment, as depicted in FIG. 4B, a filtering implementation comprises four (4) stages 40. 41, 42 and 43. Each of the stages 40-43 decimates the image in a vertical dimension and a horizontal dimension by a factor of eight, such that the image size is reduced by a factor of $8^2$=64 and thus, MSF 4000 decimates the image by a total factor of 64. Thus, at each stage, the log ratio image is downscaled by a factor of eight. This downscaling by a factor of eight is repeated at each of the msn level (e.g., stage), e.g., according to the pseudocode shown in Table 4, below.

TABLE 4

```
/* dimension for next stage */
    width = (width+6)/8 + 1;
  height = (height+6)/8 + 1;
```

At each stage, 7-tap low pass filtering may be performed over each pixel of the decimated images. An embodiment is implemented wherein the decimated images are each filtered first in a horizontal direction that corresponds to a first spatial orientation thereof, and then filtered in the vertical direction, which is perpendicular spatially in relation to the first orientation. The various scaled images are aligned at their boundaries, e.g., with padding such as mirror extension.

An amplifier applies a weighting factor 'Alpha' to the ratio image at each stage. For each of the stages 'k' wherein k comprises an integer ranging from zero to msn minus one (k=0, 1, . . . , msn−1), an embodiment computes the weighting factor Alpha (A) according to: $A_k$=2*(k+1)/(msn(msn+1)). The weights sum to unity. An embodiment may be implemented wherein the weighting factor is computed as 2*(msn−(k−1)+1)/msn*(msn+1) or as 1/msn.

Upscaling is performed (msn−1) times over the downscaled filtered ratio images. The weighted log ratio image is added to the upscaled images at each stage. An embodiment implements upscaling with interpolation (e.g., bilinear interpolation) of the preceding stage lower resolution images, e.g., using four (4) points at the spatial corners of the image and interpolation overt the horizontal and vertical dimensions thereof to construct an up-sampled block.

Stage 401 downscales and filters the input image $R_0$ and passes first ratio image $R_1$ to stage 402. Likewise, stage 402 and each of the stages 403-407, inclusive, pass downscaled low-passed ratio images, which are ordinally subsequent to the ratio image passed to it by each of their respective previous stages, to their respective next stage. The weighted ratio image from each stage is summed with the upscaled image from the next stage.

MSF 4000 generates tone mapped luma, luminance or other intensity related tone mapped values, which are written with configuration registers to off-board memory via a register interface.

In an embodiment, MSF 4000 and/or implementation 400 functions according to one or more steps of an example multiscale resolution filtering process 400. The example process 400 is described below with reference to FIG. 4B and to the flowchart depicted in FIG. 4C. Process 400 begins to process a log ratio image $R_0$ (e.g., generated in step 105 at FIG. 1B) by progressively downscaling the image over each of the levels 41, 42 and 43. At each level of downscaling, the image is progressively decimated in a vertical direction and in a horizontal direction.

In step 401, the log ratio image $R_0$ is downscaled, vertically and horizontally by a factor of 'N', in which N comprises a positive integer, e.g., eight (8). A first level downscaled log ratio image $R_1$ is thus generated. The first level downscaled log ratio image $R_1$ is then decimated by the factor N in step 402 to generate a second level downscaled log ratio image $R_2$. The second level downscaled log ratio image $R_2$ is then decimated by the factor N in step 403 to generate a third level downscaled log ratio image $R_3$. In an example embodiment, the downscaled image output of each level is low-passed. In an example embodiment, not all levels need be used.

In step 404, pixel values of the third level downscaled log ratio image $R_3$ are scaled with third level scale factors (e.g., Alpha[3]) to generate a third level weighted ratio image $R'_3$. In step 405, pixel values of the second level downscaled log ratio image $R_2$ are scaled with second level scale factors (e.g., Alpha[2]) to generate a second level scaled weighted ratio image $R'_2$. In step 406, the third level weighted ration image $R'_3$ is upscaled by the factor N and summed with the second level scaled weighted ratio image $R'_2$ to generate a second level upscaled log ratio image $R_2$.

In step 407, the first level downscaled ratio image $R'_1$ is scaled with first level scale factors (e.g., Alpha[1]) to generate a first level weighted log ratio image $R'_1$. In step 408, the second level upscaled log ratio imag$k_2$e is upscaled by the factor N and summed with the second level scaled weighted ratio image $R'_2$ to generate a first level upscaled log ratio image $\hat{R}_1$. In step 409, the log ratio image $R_0$ is scaled with zero-level scaling factors (e.g., Alpha[0]) to generate a zero-level weighted log ratio image $R'_0$. In step 410, the first level upscaled log ratio image $\hat{R}_1$ is upscaled by the factor N and summed with the zero-level level scaled weighted ratio image $R'_0$ to generate a log multiscale ratio image $\hat{R}_1$. The steps of example process 400 may be optional.

Figure 5:
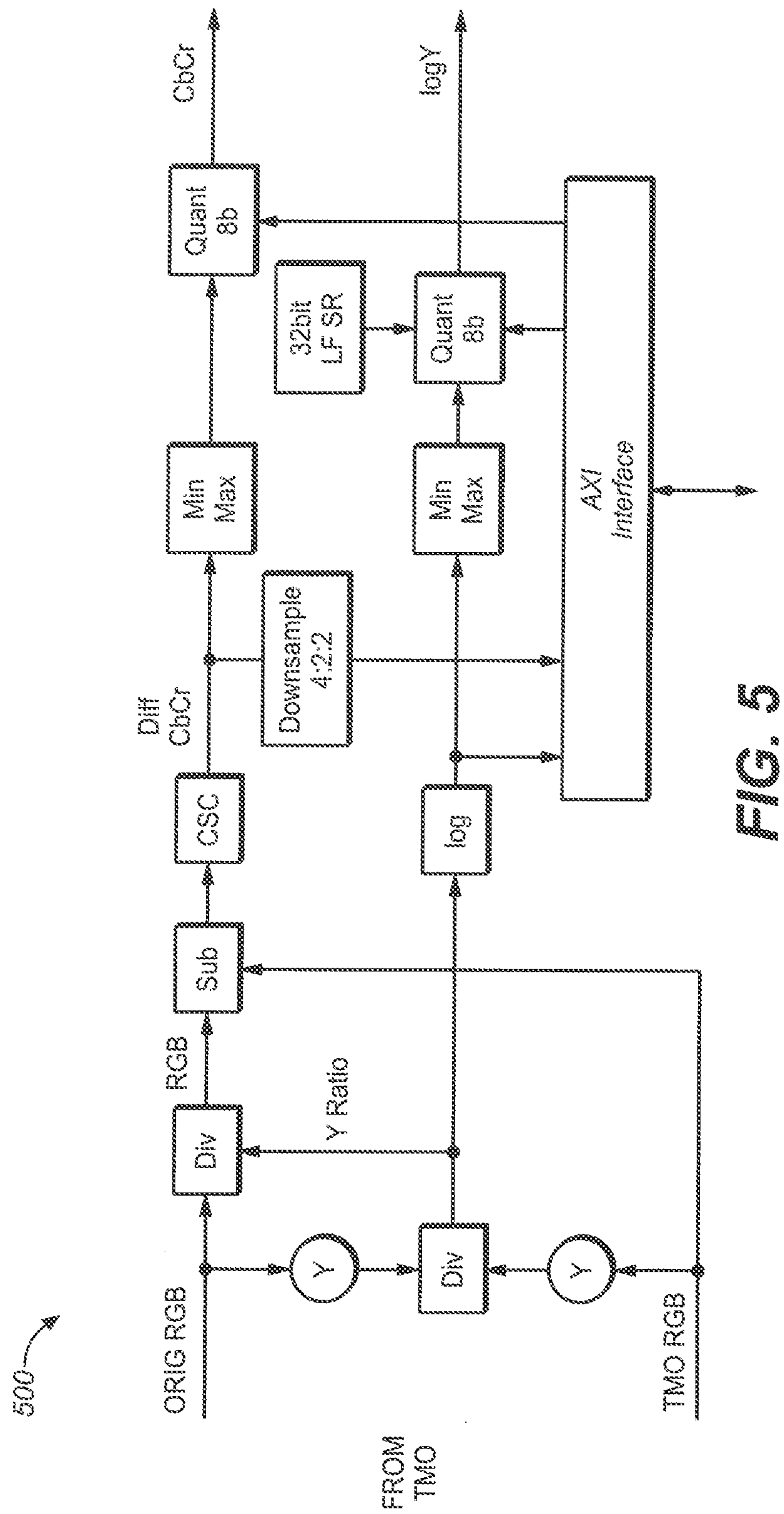
FIG. 5 depicts an example ratio image processor, according to an embodiment of the present invention.

FIG. 5 depicts an example ratio image processor 500, according to an embodiment of the present invention. An embodiment implements RI_Proc (FIG. 1) with ratio image processor 500. Ratio image processor 500 receives input images from TMO 200 (FIG. 2). A luminance ratio is computed from values luminance values Y from the original HDR input image and luminance values from the tone mapped image. Minimum and maximum values are computed over the whole picture, which are used to quantize the log luminance values log Y and the CbCr chrominance values DifffCbCr of the difference image.

The log Y and DiffCbCr values are saved/written to external memory, e.g., via an Advanced Microcontroller Bus Architecture Advanced eXtensible Interface (AXI) interface or a similarly capable interface. The externally saved/stored values are read/loaded back via the AXI to be timely quantized. A linear feedback shift register (LFSR) generates random number values for dithering over the log Y channel during quantization. RI_Proc 500 outputs the quantized DiffCbCr and log Y values to a JPEG encoder, which may output images in the JPEG format that correspond to the input image.

Figure 6A:
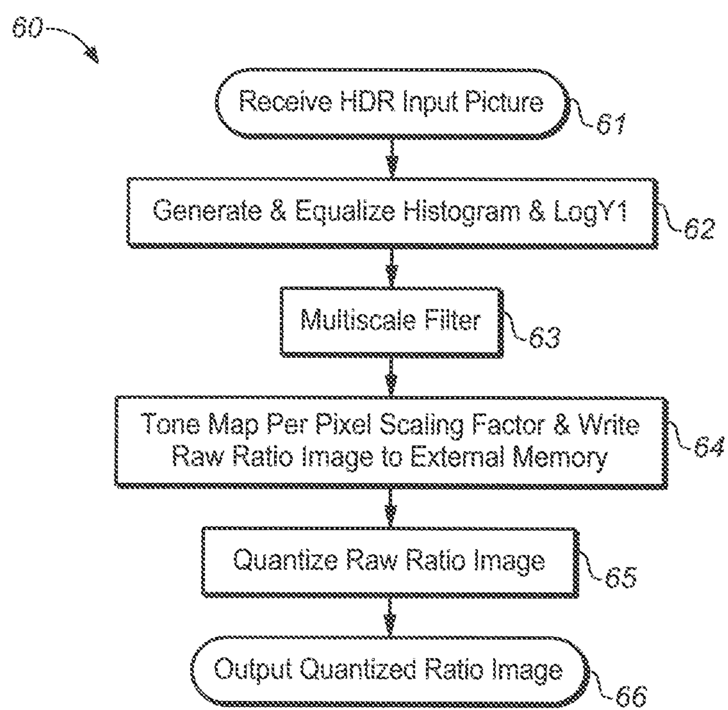
FIG. 6A and FIG. 6B depict example encoding process data flows for HDR images, according to an embodiment of the present invention.
Figures 1, 6B:
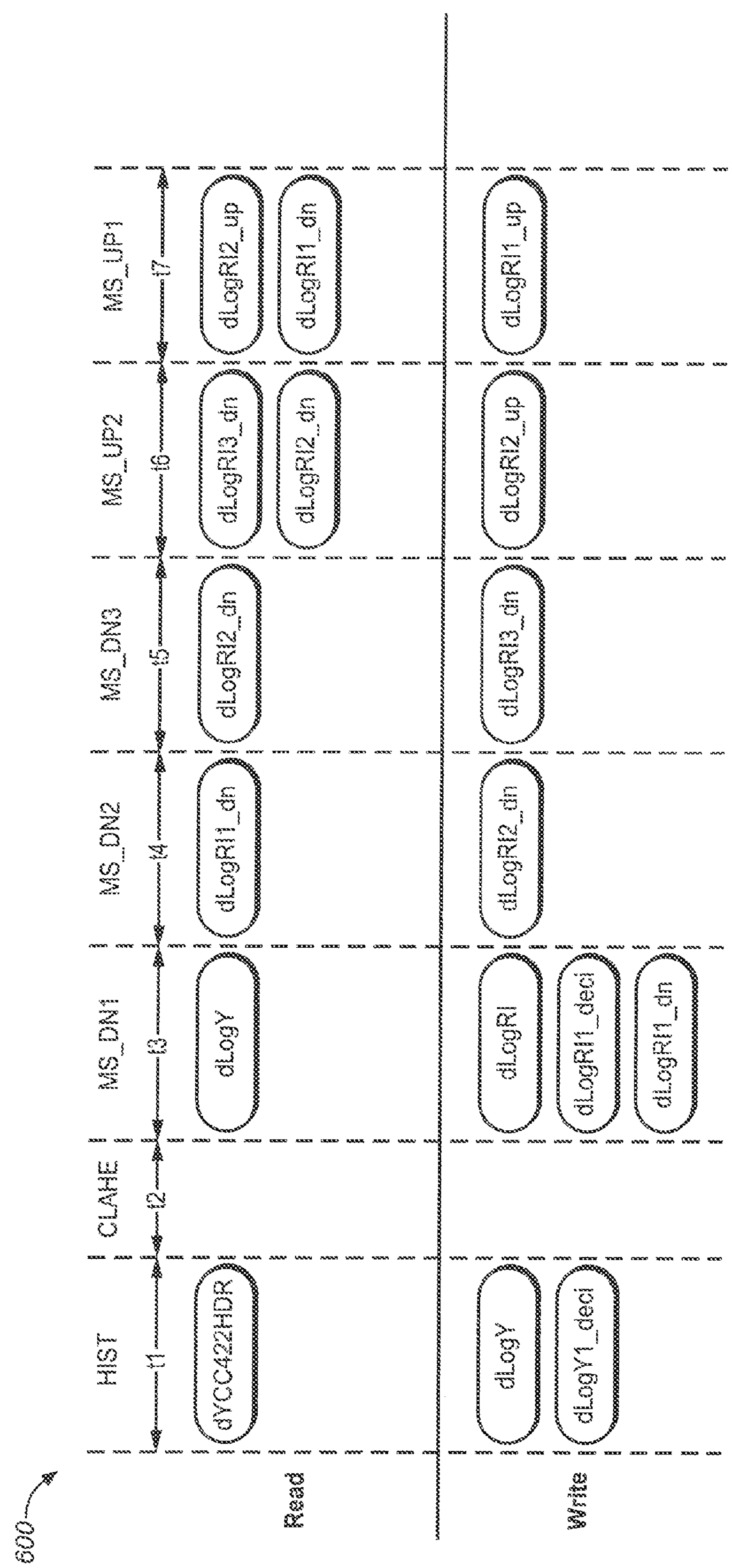
Figures 2, 6B:
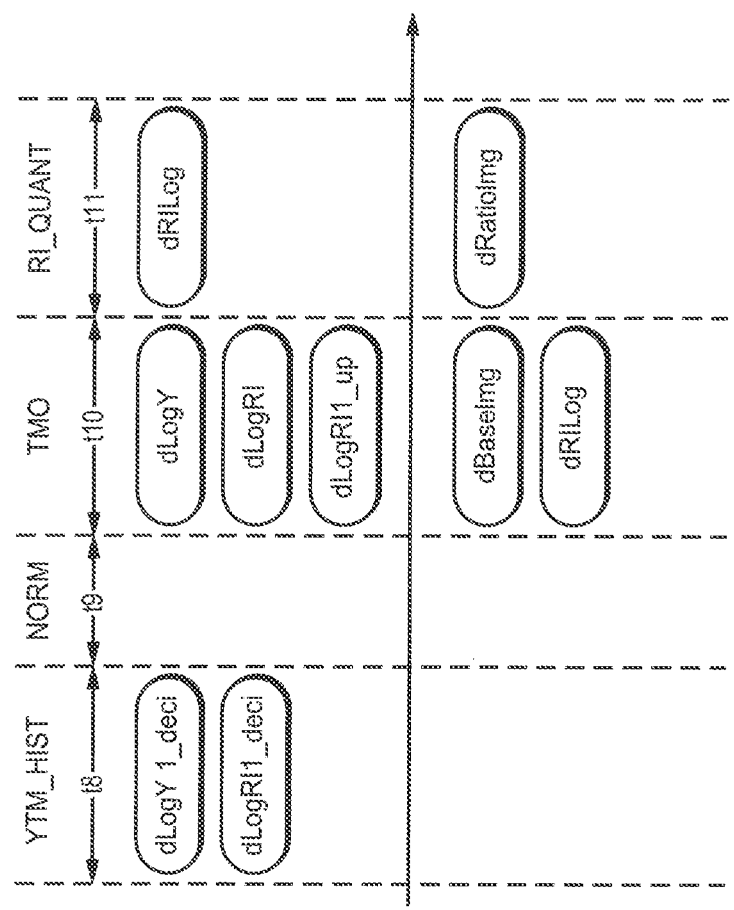

FIG. 6A and FIG. 6B respectively depict an example encoding process 60 and an example data flow timeline 600 thereof, according to an embodiment of the present invention. Upon receiving (61) an HDR input picture, a histogram and a downscaled LogY image LogY1 is generated in step 62. The histogram is normalized. In flow 600, the JPEG-HDR encoder (e.g., encoder 100; FIG. 1) core reads the whole HDR input image. The encoder generates the histogram based on Log Y values of the input image pixels, equalizes the histogram, and writes Log Y1 to a downscaled image buffer Buf-f_Log 1. In an embodiment, the histogram is equalized using CLAHE.

In step 63, the multiscale filtering is performed, which generates the actual per-pixel scaling factor for use in the tone mapping. In step 64, the per-pixel scaling factor is applied over each pixel. The tone mapped base image is converted to 8-bit gamma-coded YCbCr4:2:2/4:2:0/4:4:4 and may be sent to a JPEG encoder, which writes a compressed base image to external memory. Original and tone mapped RGB data is processed to generate the raw pre-quantized ratio image, which is also written to external memory. In step 65, the raw ratio image is read back from external memory and quantized. The quantized ratio image may be output (66) to the JPEG encoder and compressed therewith.

Example Weighted, Multi Region-Based Exposure for HDR Images.

A traditional, low-end consumer display device, such as a smart phone, a computer monitor, and the like, may not be able to display the full dynamic range of a JPEG-HDR image. In such cases, the display will typically output a tone-mapped, low dynamic range (LDR) version of the corresponding HDR image. This tone-mapped image is typically generated automatically by the camera with no input from the user, thus it may not capture the intent of the photographer.

In some embodiments, a user may scroll through the HDR picture using the device's user interface, such as a touch-screen, a computer mouse, scroll bars, and the like. In that case, the user may be able to observe part of the image at the full dynamic range, but the rest of the image may be displayed as too dark or too bright. However, a user may want to view details in multiple parts of the image. Thus it would be beneficial to allow users to adjust the exposure of an HDR image based on regions of interest.

In one embodiment, the exposure of the final HDR image may take into consideration two or more regions of interest selected by the user. These regions may be selected either before capturing the image (e.g., with a camera or other capturing device) or after capturing the image (e.g., when displaying the corresponding LDR image). In some embodiments with a touch screen interface (e.g., an iPhone or an iPad) these regions may represent pixels of relatively identical luminance surrounding one or more pixels touched by the user. In other embodiments, a user may use alternative interfaces to select these regions, such as a computer mouse, a track ball, a keyboard, and the like. In yet other embodiments, these regions may be selected automatically based on preselected user preferences (e.g., faces, animals, text, etc.).

In one embodiment, an area surrounding a first touch point can be set to a first optimal exposure gamma (e.g., 18% grey). Next, for a second touch point, a second, optimal exposure gamma is computed. The final image may be displayed using a final exposure gamma weighted by the first and second exposure gammas. This brings both the first and second touch points within the dynamic range of the display while blending the rest of the resulting picture. Any number of touch points can be identified, such as 3, 4, or N. The weighting factors can be an equal average, mean, median, proportional weight, linear, non-linear, and/or capped (maximum/minimum). In a specific embodiment, the technique can be undone by a user command (e.g., undo button).

Figure 7:
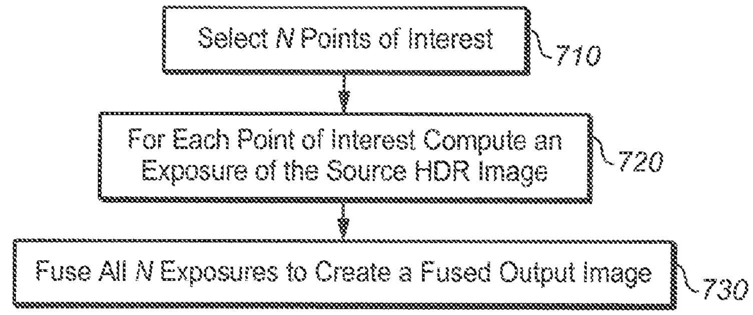
FIG. 7 depicts a fusion-merge exposure process for displaying an HDR image, according to an embodiment of this invention.

As depicted in FIG. 7, in another embodiment, a resultant picture can be generated using a fusion-merge process. In this process, for each selected point of interest (710), the process generates a corresponding exposed LDR image (720). Given N such exposures (or LDR images) created from the original HDR image, an embodiment may create a fused image by suitably blending all N exposures into a single output image (730). An example of such a fusion process may be implemented using techniques described in "Exposure Fusion," by T. Mertens. et al., 15*th Pacific Conference on Computer Graphics and Applications* (Pacific Graphics, 2007), at pp. 382-390, incorporated by reference in its entirety as if fully set forth in herein.

Example Adaptive Ratio Image Quantization

Given a luminance HDR image ($Y_h$) and its tone-mapped representation ($Y_t$), as described earlier, a ratio image $Y_R$ may be expressed as $$Y_R = \frac{Y_h}{Y_t}.$$

The dynamic range of the ratio image may be compressed by applying to it an invertible function, such as a logarithmic function or a square root function. Thus, in one embodiment where the log function is applied, $$\log(Y_R) = \log\left(\frac{Y_h}{Y_t}\right).$$

The log ratio image ($\log(Y_R)$) may also be further quantized to yield an 8-bit ratio image:

$$Y_{8bit} = \mathrm{round}\left(255 * \frac{\log(Y_R) - \min(\log(Y_R))}{\max(\log(Y_R)) - \min(\log(Y_R))}\right).$$

In as much as the original ratio image comprises pixel values represented in high precision or dynamic range (e.g., using floating-point numbers), quantizing the ratio image into 8-bit pixel value will generate round-off errors that cannot be recovered when applying the inverse quantization function. This error may affect the accuracy of the image encoding and may limit the dynamic range of images that that can be encoded using the JPEG-HDR format.

In an embodiment, the log function above is thus replaced by an arbitrary, invertible function 'F.' Given F, the quantized 8-bit ratio image may be expressed as $$Y_{8bit} = \mathrm{round}\left(255 * \frac{F(Y_R) - \min(F(Y_R))}{\max(F(Y_R)) - \min(F(Y_R))}\right).$$

This allows decoders to recover the original ratio image per:

$$Y_R' = F^{-1}\left(Y_{8bit} * \frac{(\max(F(Y_R)) - \min(F(Y_R)))}{255} + \min(F(Y_R))\right),$$

wherein $Y_R'$ denotes the recovered ratio image. In an embodiment, the minimum and maximum $F(Y_R)$ values are included in the JPEG-HDR image data as metadata, which are accessible by the JPEG-decoder.

In an embodiment, the F function may be selected so that it minimizes $M(Y_R', Y_R)$, where M denotes a metric that measures the difference between $Y_R'$ and $Y_R$ according to some quality criterion, such as: the mean square error, signal to noise ratio (SNR), or peak signal to noise ratio (PSNR). M (e.g., the MSE between the two images) represents an objective function for the optimization process of F. F can be a parametric function or can be defined via a look up table (LUT). Given M, one may apply well-known optimization techniques to determine F, such as the Nelder-Mead method described in "A simplex method for function minimization", by J. A Nelder, John and R. Mead, Computer Journal, No. 7, at pp. 308-313, 1965.

In an embodiment, the JPEG-HDR header may include a decoding LUT that represents the inverse encoding function $F^{-1}$. A compliant JPEG-HDR decoder may uses the LUT to convert the received ratio image, from 8-bit data into the higher precision (e.g., floating-point) Y channel data. The LUT may have 256 entries that map 8 bit data directly to floating point values.

Example Histogram Equalization-Based Methods

An embodiment relates to computational efficiency in that histogram equalization or contrast limited histogram equalization provides a process to derive the F function, as well. The histogram equalization process converts a source luminance that has an arbitrary distribution into a luminance with uniform histogram so that the ratio image may be coded more efficiently. In an embodiment that uses histogram equalization, F may be computed as described below.

a) Compute hist, the histogram of $Y_R$. A histogram simply denotes the number of instances (e.g., $hist_i$) pixel value i is encountered in the ratio image;

b) Compute c_hist, the cumulative histogram of hist. For example, the cumulative histogram may be computed as:

$$c\_hist_i=\Sigma_{j=1}^{i} hist_j;\text{ and}$$

c) Determine F by normalizing and scaling c_hist. For example:

$$F_i=((c\_hist_i-\min(c\_hist))/(\max(c\_hist)-\min(c\_hist)) *scale,$$

wherein the variable scale determines the maximum value of F, e.g., 255.

The encoding function F computed as above may have areas with infinite derivative or slope, thus F may not provide a unique mapping and the inverse the function $F^{-1}$ does not exist. Limiting the slope or derivative of F allows an embodiment to ensure the uniqueness of the mapping provided by F and the existence of the $F^{-1}$.

The histogram equalization approach makes the encoding accuracy proportional to the frequency of luminance value occurrences. Thus, less frequently occurring luminance values may be quantized with a higher error and frequently occurring luminance values are quantized with lower error.

Example Custom Color Gamut Support in JPEG-HDR

A typical, single image, file format may use the ICC (International Color Consortium) or the WCS (Windows Color management System) profiles to communicate color information to the rendering device (e.g., a display). ICC profiles and WCS profiles require an image to be rendered to a specific color space. As a part of the rendering, all the colors that are not representable in the target color space should be gamut mapped to representable colors. As a result of this gamut mapping, some of the color information may be lost in the rendered image.

For example, an image may be captured by a high end, wide color gamut, camera or it may be created using computer graphics (CG) software. The resulting image then may be rendered to the sRGB color space. The sRGB color space is the most common color space and is supported by the majority of operating systems and display devices. However, as the sRGB color space has relatively small color gamut, all the image colors that are not covered by sRGB need to be mapped into sRGB colors. If a sRGB image is then sent to an imaging device with much wider color gamut, then there is no reliable way to recover the original, wider gamut mapped colors. Thus, gamut mapping may cause irreversible information loss and may result in suboptimal color reproduction.

Another aspect of image rendering is related to specifying viewing conditions. For example, home and office viewing conditions are typically different from the viewing conditions used in color grading or color matching environment. The ICC workflow specifies exact viewing conditions (VC), making the workflow inflexible. WCS allows for some VC flexibility, but once an image is rendered, it is practically impossible to reverse the change.

Both gamut mapping and VC define a set of rendering decisions that a content creator should make based on assumptions about how an image will be viewed. In real life, it is impossible to make optimal rendering decisions for all possible use cases and target imaging devices as well as all possible purposes.

In an embodiment, the JPEG-HDR file format allows for two separate sets of color-gamut related metadata: one set related to the capture device or original HDR data, and another set related to target legacy workflows that use colored images. Thus, legacy imaging devices with standard color gamut and dynamic range can still show a default rendered image based on the conventional ICC and WCS workflows to deliver color-accurate image content. At the same time, devices supporting wider gamut higher dynamic range and/or just-in-time rendering may also be able to recover the original image data for dynamic rendering that takes into account both viewing conditions and the device properties. For example, an application may recover original scene data and render it based on current viewing conditions and the characteristics of the target display device. Thus, a base image may provide backward compatibility with the existing color management workflows, while the JPEG-HDR metadata allow for more accurate and flexible just-in-time rendering.

A JPEG-HDR image contains a base image (e.g., a baseline JPEG image) and HDR metadata (e.g., a ratio image and color residual data). The base image is a tone-mapped and gamut mapped rendered image, typically rendered in the sRGB color space. The JPEG container may either indicate the color space of the base image or it may include an ICC/WCS color profile that enables consistent color reproduction on a variety of imaging devices.

The HDR metadata may also include color space information in either a device-independent space, such as XYZ primaries, or in an attached, second, ICC/WCS color profile. The HDR metadata color space may be different from the color space of the base image. The color gamut of the metadata is typically larger than the color gamut of the base image. For example, the metadata color space for cameras typically matches the color space of the camera sensors. For CG images, the metadata color space may include all colors presented in the original image. Thus, an embodiment provides enhanced support of wide color gamut in JPEG-HDR using two or more color space descriptors, e.g., profiles. One profile defines the encoding color space of the base image and the second profile defines the encoding color space of the HDR metadata.

Figure 8A:
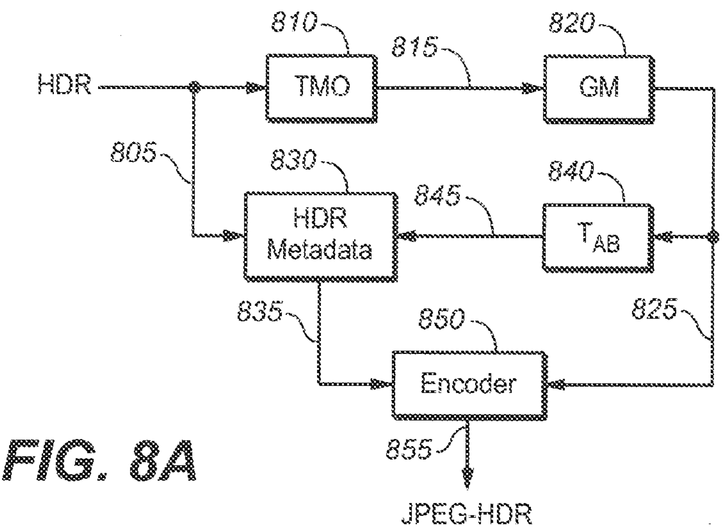
FIG. 8A and FIG. 8B depict example JPEG-HDR encoding and decoding processes supporting wide color gamut and multiple color spaces, according to embodiments of the invention.

FIG. 8A depicts an encoding process supporting dual color spaces according to an example embodiment. As depicted in FIG. 8A, input HDR image 805, captured in color space B, may be tone-mapped by TMO process 810 to generate a tone-mapped image 815, in color space B. Image 815, may be further processed by gamut transformation process 820 to generate a base image 825, in color space A. Using information about the two color spaces, one may create a color transform $T_{AB}$ for transforming images from color space A to color space B. Transform $T_{AB}$ may be applied to base image 825 in color transform step 840 to create a base image 845, in color space B.

Using the original HDR image 805 and base image 845, process 830 may generate the HDR metadata 835 according to the methods described earlier in this invention. Finally, image 825 (in color space A) and HDR metadata 835 (in color space B) may be coded and combined to generate a JPEG-HDR image (855). The file format of the JPEG-HDR image 855 may include the appropriate color descriptors for the two color spaces. In some embodiments, processing steps 810 and 820 may be combined into a single step, wherein given an HDR image (805) in color space B, it outputs a tone-mapped image in color space A (825). Using additive color spaces, such as a matrix-TRC (tone reproduction curve) allows combining steps 810 and 820 during the encoding, as both gamut mapping and tone mapping can be done in the original color space (e.g., B). Also color transforms between color spaces become more accurate and computationally more efficient.

Figure 8B:
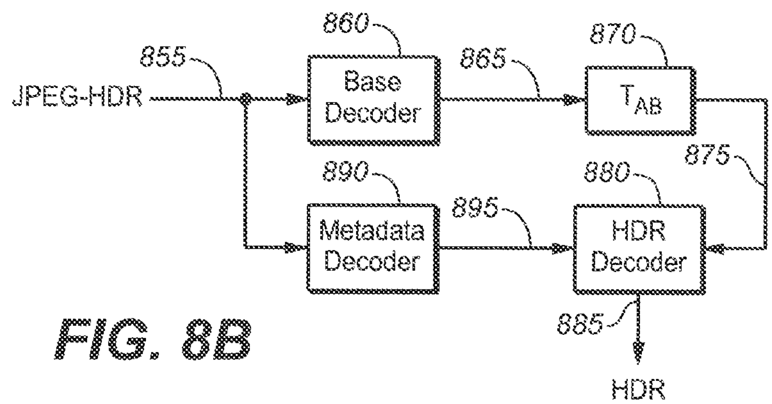

FIG. 8B depicts a decoding process supporting dual color gamuts according to an example embodiment. As depicted in FIG. 8B, given an input JPEG-HDR image, which defines data in two color spaces: a base image in color space A and HDR metadata in color space B, a base decoder extracts the base image 865, in color space A (say, sRGB). Image 865 may be used to display the base image in legacy display devices with standard dynamic range.

Using information about the two color spaces, one may create a color transform $T_{AB}$ for transforming images from color space A to color space B. Transform $T_{AB}$ may be applied to base image 865 in color transform step 870 to create a base image 875, in color space B. Given input 855, metadata decoding process 890 extracts the HDR metadata 895 in color space B. Finally, HDR decoder 880 may combine the base image 875 and the metadata 895 to generate an HDR image 885 in color space B.

If HDR metadata resides in a wide color space, which encapsulates all possible colors of an image, the encoded image values will be always positive. The positive values allow for validating the images during the encoding and decoding stages. Namely, if negative values are detected, these values may be zeroed and/or an error message may be issued. The methods described herein may also be applied to coding input standard dynamic range (SDR) images with wider color gamut than conventional SDR images. For input SDR images (e.g., 805) the TMO processing step (810) may be omitted.

Image 885 may be rendered subsequently to target imaging device for specific and current viewing conditions. Standard displays, HDR displays, wide gamut displays and printers are examples of the target imaging devices. Dimly lit and neutral color painted, brightly lit and yellow painted rooms are example of different viewing conditions.

An example embodiment of the present invention is thus described in relation to encoding HDR images. Log-luminances in an HDR input image are histogrammed to generate a tone-map, along with which a log global tone-mapped luminance image is computed. The log global tone-mapped luminance image is downscaled. The log-luminances and the log global tone-mapped luminance image generate a log ratio image. Multi-scale resolution filtering the log ratio image generates a log multi-scale ratio image. The log multi-scale ratio image and the log luminances generate a second log tone-mapped image, which is normalized to output a tone-mapped image based on the downscaled log global tone-mapped luminance image and the normalized image. The HDR input image and the output tone-mapped image generate a second ratio image, which is quantized. The quantized base image and base ratio image may be output, e.g., to a JPEG encoder for compression in the JPEG format.

Example JPEG-HDR Encoding with Multiscale Ratio Image Formation

In an embodiment, the additional image metadata comprises a local multiscale gray scale ratio image, which is derived from the original HDR image. An embodiment uses a color gamut, such as the extended-YCC gamut issued with the image format herein to enable full recovery at each pixel in the HDR version of the original HDR image, as generated/restored from the tone-mapped image and the local multiscale gray scale ratio image. In an embodiment, techniques as described herein minimize the number of fully black tone-mapped values in the tone-mapped image below a threshold (e.g., 0.01%, 0.1%, 1%, 2%, etc. of the total number of pixels in the tone-mapped image) to enable full recovery at each pixel in the HDR version of the original HDR image.

Under techniques herein, instead of using a global tone mapping (TM) operator that compresses global contrast in order to fit the desired output range of luminance values and loses local contrast that matters to human visual perception, local multiscale tone mapping processing may be used to generate the tone-mapped image that improves the local contrast that would have been compromised in a global TM operator, while leaving the overall mapping as it is. In an embodiment, the local multiscale TM processing uses a global curve (e.g., a histogram adjustment TM curve) to map luminance values without loss of detail. In an embodiment, the local multiscale TM processing is performed efficiently without generating/introducing new artifacts (such as halos) in the process. In a particular embodiment, efficient recursive processing is implemented to perform local multiscale processing as described herein with high computational efficiency. In a particular possible embodiment, the local multiscale processing only spends 30% longer time than TM processing by a global TM operator.

Under techniques herein, instead of using a global tone mapping (TM) operator that compresses global contrast in order to fit the desired output range of luminance values and loses local contrast that matters to human visual perception, local multiscale tone mapping processing may be used to generate the tone-mapped image that improves the local contrast that would have been compromised in a global TM operator, while leaving the overall mapping as it is. In an embodiment, the local multiscale TM processing uses a global curve (e.g., a histogram adjustment TM curve) to map luminance values without loss of detail. In an embodiment, the local multiscale TM processing is performed efficiently without generating/introducing new artifacts (such as halos) in the process. In a particular embodiment, efficient recursive processing is implemented to perform local multiscale processing as described herein with high computational efficiency. In a particular possible embodiment, the local multiscale processing only spends 30% longer time than TM processing by a global TM operator.

In an embodiment, an input HDR image is loaded and its luminance values are converted into the logarithmic domain. A histogram adjustment TM curve is computed and applied to the luminance values in order to determine a global ratio gray scale image. As used herein, a ratio image generally refers to an image comprising ratio values between luminance values in a pre-tone-mapping image (e.g., an input HDR image or its logarithmic equivalent) and luminance values in a post-tone-mapping image (e.g., a tone-mapped image or its logarithmic equivalent). In an embodiment, the ratio image is logically represented as the pre-tone-mapping image divided by the post-tone-mapping image at each pixel location in the non-logarithmic domain, or equivalently as the pre-tone-mapping image minus the post-tone-mapping image at each pixel location in the logarithmic domain. In some other an embodiment, the ratio image is logically represented as the post-tone-mapping image divided by the pre-tone-mapping image at each pixel location in the non-logarithmic domain, or equivalently as the post-tone-mapping image minus the pre-tone-mapping image at each pixel location in the logarithmic domain. In all these embodiments, it should be noted that that the pre-tone-mapping image (e.g., a local multiscale TM image) may be obtained via simple algebraic operations (e.g., multiplications/divisions in the non-logarithmic domain; additions subtractions in the logarithmic domain) if the ratio image (e.g., a local multiscale TM image) and the pre-tone-mapping image (e.g., an input HDR image) are known.

In an embodiment, in the logarithmic domain, the global ratio image that is used to generate other ratio images to be merged into the local multiscale ratio is computed efficiently by subtractions using 16-bit integer quantities. In an embodiment, a reference maximum over a tone-mapped image may be computed and the tone-mapped image may be modified so that no greater than a small percentage of pixels lie outside a supported color gamut (e.g., an extended-YCC color gamut).

In an embodiment, in the logarithmic domain, the global ratio image that is used to generate other ratio images to be merged into the local multiscale ratio is computed efficiently by subtractions using 16-bit integer quantities. In an embodiment, a reference maximum over a tone-mapped image may be computed and the tone-mapped image may be modified so that no greater than a small percentage of pixels lie outside a supported color gamut (e.g., an extended-YCC color gamut).

Equivalents, Extensions, Alternatives and Miscellaneous

In the foregoing specification, an embodiment of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to encode with a processor a high dynamic range (HDR) image, the method comprising:

receiving an input HDR image (HDR) with an input color gamut and an input dynamic range;

applying a tone mapping and a gamut mapping function to the input HDR image to generate a first base image in a first dynamic range and a first color space, wherein the first color space comprises a first color gamut, wherein the first dynamic range is lower than the input dynamic range and the first color gamut is narrower than the input color gamut;

applying a color transform process to the first base image to generate a second base image in a second color space with a second color gamut, wherein the second color gamut is different than the first color gamut;

generating HDR metadata in response to the input HDR image and the second base image; and generating an output coded HDR image based on the first base image and the HDR metadata.

2. The method of claim 1, wherein a file format for the output coded HDR image comprises color descriptors for the first color space and the second color space.

3. The method of claim 1, wherein the first color space comprises the sRGB color space.

4. The method of claim 1, wherein the second color space comprises a device-independent color space.

5. The method of claim 1, wherein the HDR metadata comprise a ratio image and color residual data.

6. The method of claim 1, wherein the second base image has a lower dynamic range than the dynamic range of the input HDR image.

7. The method of claim 1, wherein the second color gamut is wider than the first color gamut.

8. A method to decode with a processor a coded high-dynamic range (HDR) image, the method comprising:

receiving a coded HDR image comprising a coded base image in a first color space and HDR metadata related to a second color space, the second color space being different than the first color space;

generating a decoded base image in the first color space based on the coded base image;

applying a color transform to the decoded base image to generate a second base image in the second color space; and combining the second base image and the HDR metadata related to the second color space to generate a decoded HDR image in the second color space.

9. The method of claim 8, wherein the first color space comprises the sRGB color space.

10. The method of claim 8, wherein the second color space has a wider color gamut than the first color space.

11. The method of claim 8, wherein the decoded base image has a lower dynamic range than the decoded HDR image.

12. A non-transitory computer-readable storage medium having stored thereon computer-executable instructions for executing with a processor a method in accordance with claim 1.

13. A non-transitory computer-readable storage medium having stored thereon computer-executable instructions for executing with a processor a method in accordance with claim 8.

14. An apparatus to decode a coded high-dynamic range (HDR) image, the apparatus comprising:

an input to receive a coded HDR image comprising a coded base image in a first color space and HDR metadata related to a second color space, the second color space being different than the first color space;

a processor to generate a decoded base image in the first color space based on the coded base image;

a processor to apply a color transform to the decoded base image to generate a second base image in the second color space; and a processor to combine the second base image and the HDR metadata related to the second color space to generate a decoded HDR image in the second color space; and an output to output the decoded HDR image.

* * * * *